United States Patent Office 3,497,390
Patented Feb. 24, 1970

3,497,390
FUEL CELLS: PALLADIUM HYDROGEN DIFFUSION ELECTRODE
Norbert D. Greene and Harold J. Cleary, Troy, N.Y., and Livio Lederer, Paris, France, assignors to the United States of America as represented by the Secretary of the Air Force
Filed Nov. 29, 1966, Ser. No. 597,822
Int. Cl. H01m 27/00, 13/00
U.S. Cl. 136—86        1 Claim

ABSTRACT OF THE DISCLOSURE

A fuel cell having an electrolyte positioned in a container between a porous oxygen electrode to which oxygen is supplied and a non-porous palladium anode to which gaseous hydrogen is supplied. The palladium anode is prepared by heating a palladium strip in air to a temperature between 500° C. and 875° C. Output means are provided for the anode and cathode.

---

This invention concerns fuel cells and, more particularly, concerns a metallic palladium electrode through which hydrogen diffuses. The palladium electrode converts molecular hydrogen into atomic hydrogen then into ionic hydrogen in which state the hydrogen enters the cell electrolyte for an improved cell performance.

Fuel cells are electrochemical devices which consist of nonconsumable electrodes, an electrolyte and a control mechanism. The anode here of interest is the positive pole electrode of the cell. Fuel cell types operate at high, medium and low temperatures. The cell here of interest operates efficiently between room temperature of about 22° C. and the boiling point of the aqueous electrolyte used in the cell. Representative fuel cell past practices are found in the Patents Nos. 3,062,909 and 2,912,478.

The object of the present invention is the provision of a new and improved anode electrode for use in fuel cells.

Figure 1:
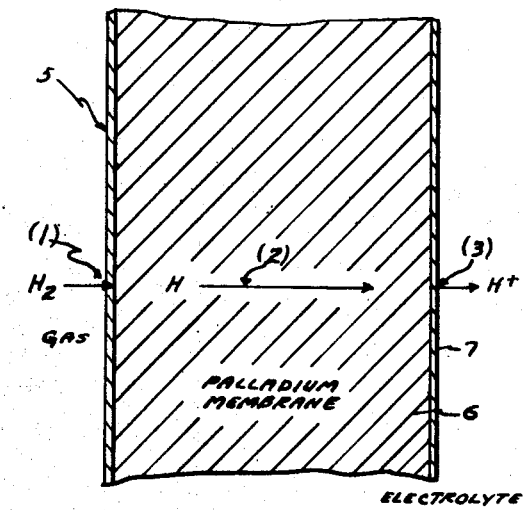
FIG. 1 is a fragmentary sectional view of a palladium hydrogen diffusion electrode that embodies the present invention.

In FIG. 1 of the drawings is shown a fragmentary view of a new type of palladium membrane electrode 5 that embodies the present invention. The palladium membrane electrode 5 consists of a palladium strip 6 that illustratively is 0.01 inch thick and is pretreated by being heated in air to provide a surface coat 7 of palladium oxide.

The new type of fuel cell electrode is a solid, non-porous, metallic palladium electrode through which hydrogen diffuses. Solid electrodes offer distinct advantages over porous electrodes in terms of integrity and reliability of engineering design. Palladium is of interest because of its high rate of hydrogen difusion. As an electrode, the palladium serves as a membrane separating gaseous hydrogen from an electrolytic solution. When so positioned in a fuel cell, three processes occur:

(1) Hydrogen gas molecules are adsorbed at the gas/metal interface. These hydrogen molecules dissociate into atoms which are absorbed into the metal, as indicated in FIG. 1 at (1).

(2) The absorbed hydrogen atoms diffuse, probably as protons, through the solid palladium to the solid/electrolyte interface, as indicated at (2).

(3) The hydrogen atoms encountering the electrolyte at the solid/electrolyte interface are oxidized to hydrogen ions and pass into the electrolyte and diffuse away from the electrode at (3).

One or more of these processes governs the overall rate of hydrogen transport which, for fuel cell applications, should be as high as possible. For thin membranes, steps (1) and (3) become kinetically unimportant if both surfaces are suitably activated and, in the limiting case, the hydrogen flow rate is determined by diffusion within the solid.

Figure 2:
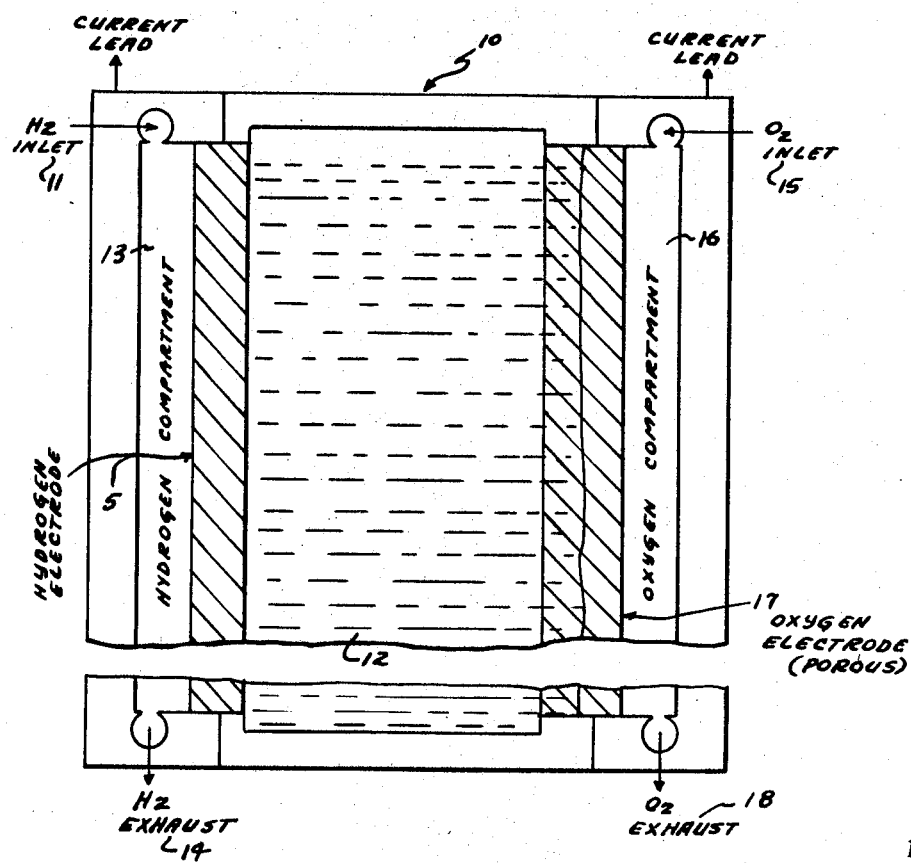
FIG. 2 is a diagrammatic view of a fuel cell embodying the anode shown in FIG. 1.

In FIG. 2 is shown the electrode 5 installed as the hydrogen electrode within a fuel cell 10. Gaseous hydrogen is supplied to the cell from the hydrogen inlet 11 and is applied to the electrode 5 and in passing through the anode is fed into the electrolyte 12 as ionic hydrogen. Unused hydrogen is released from the hydrogen compartment 13 of the cell 10 through the hydrogen exhaust 14.

Gaseous oxygen is supplied to the cell from the oxygen inlet 15 to the cell oxygen compartment 16 and is applied to the $O_2$ electrode 17. Unused $O_2$ is released from the $O_2$ compartment 16 through the $O_2$ exhaust 18.

In this schematic diagram of a low temperature hydrogen-oxygen fuel cell, hydrogen as fuel is oxidized at the anode and oxygen is reduced at the cathode as current flows through the external circuit.

Several performance parameters are used in evaluating the cell operation. Important parameters are current density and voltage, the latter of which indicates the cell efficiency.

Figure 3:
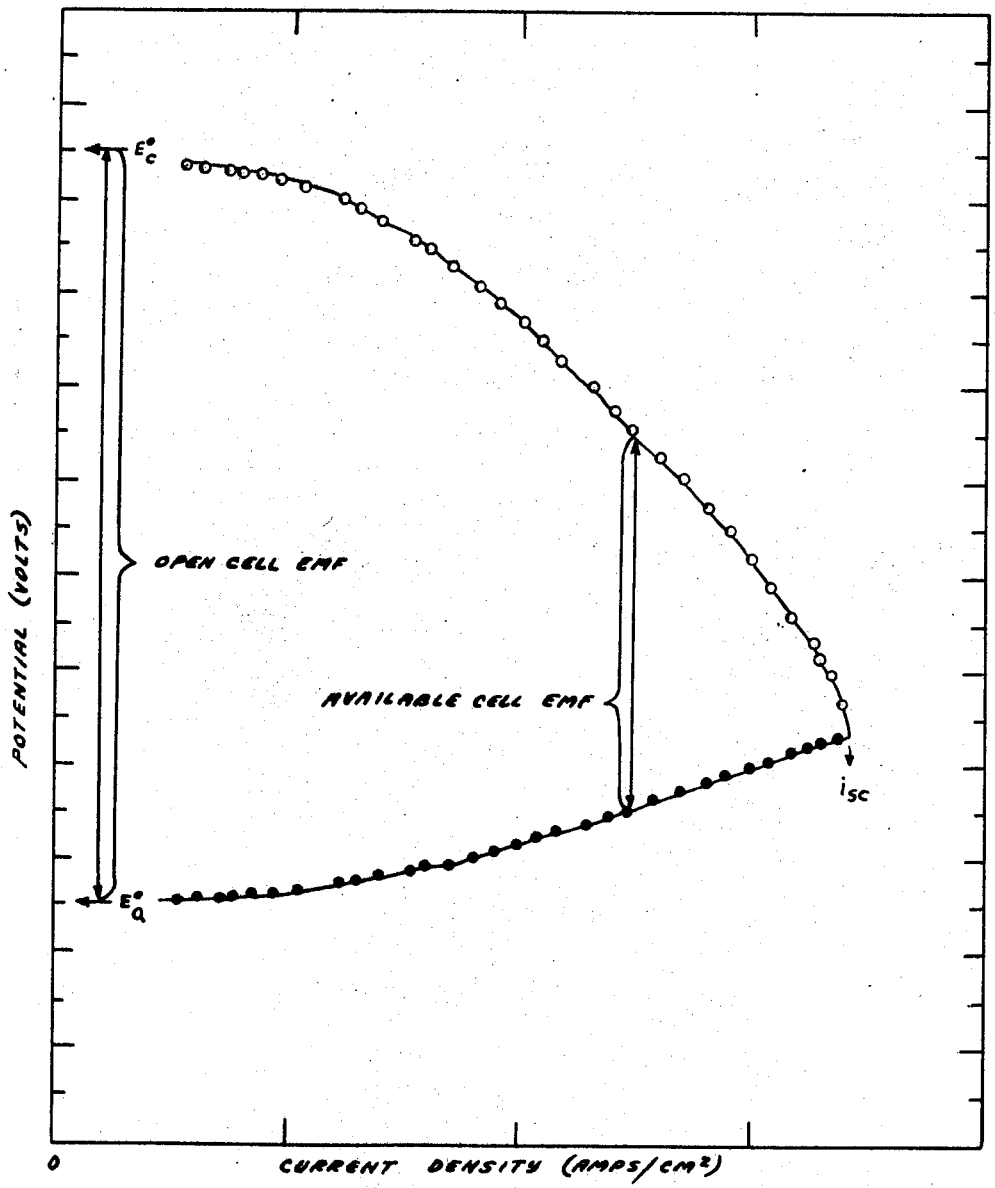
FIG. 3 is a graph of the polarization relationship of the cell shown in FIG. 2.

In FIG. 3 of the drawings is shown schematically the polarization relationship or the shift in the potential of each of the cell electrodes of the fuel cell in FIG. 2, when an external load is applied to the cell. Ideally, this change in potential or polarization should be small since it decreases the available cell voltage. The curves are experimentally determined values. Current density is plotted along the abscissa and voltages are plotted along the ordinate.

In testing the palladium electrode that is disclosed herein, the standard technique that is used is to polarize the electrode using an external power source while it is in contact with the appropriate gas as the electrolyte. The electrode potential is measured against a reference electrode as the current density is varied. The resulting parameters are used to predict the behavior of the electrode installed in the fuel cell.

Figure 4:
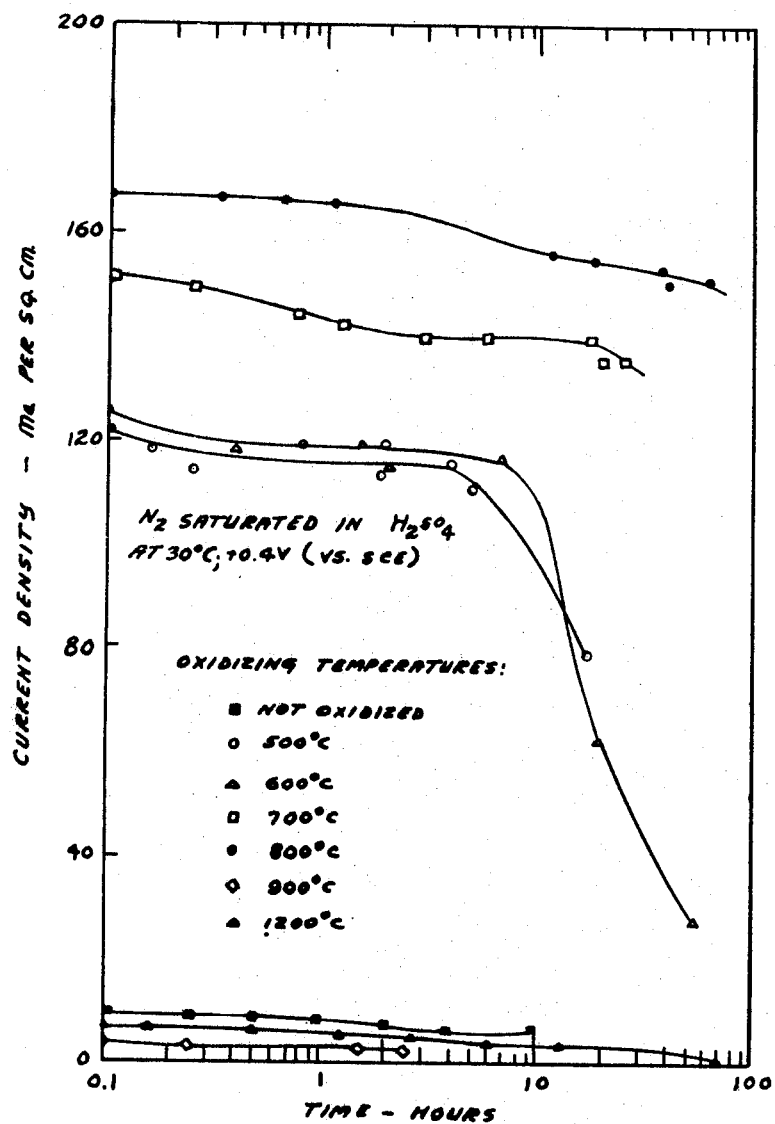
FIG. 4 is a graph showing the effect of oxidizing temperatures on the performance of the electrode shown in FIG. 1.

It will be apparent from the graph in FIG. 4 that the pretreatment by oxidizing the surface of the palladium electrode at temperatures near 800° C. resulted in the best electrode performance. Current densities in excess of 150 ma./cm$^2$ were maintained and at +0.4 volt under one atmosphere of pressure, for periods up to 50 hours on electrodes of 0.01 inch wall thickness pretreated at 800° C.

These current densities correspond to the condition of solid state diffusion control of the hydrogen transport. Pretreatment of the electrodes by heating in air produces a surface film of palladium oxide if the temperature does not exceed 875° C. where palladium oxide decomposes.

The increased efficiency of pretreated palladium electrodes is believed to be due to the presence of the surface palladium oxide that increases the dissociation of molecular hydrogen gas $H_2$ to ionic H within the electrode.

We claim:
1. A fuel cell having an oxygen porous cathode, means for supplying an oxidant to said cathode, a non-porous palladium anode which has been heat treated in air at a temperature of about 800° C., means for supplying gaseous hydrogen to said anode, an electrolyte between said anode and said cathode and output means connected to said anode and said cathode.

References Cited

UNITED STATES PATENTS

| | | | |
|---|---|---|---|
| 3,207,682 | 9/1965 | Oswin et al. | 204—140 |
| 3,271,327 | 9/1966 | McEvoy et al. | 252—472 |
| 3,310,434 | 3/1967 | Kordesch | 117—227 |
| 3,318,730 | 5/1967 | Kreiselmaier | 117—212 |
| 3,337,368 | 8/1967 | Oswin | 136—86 |
| 3,337,369 | 8/1967 | Frazier | 136—86 |
| 3,346,421 | 10/1967 | Thompson et al. | 136—120 |
| 3,375,140 | 3/1968 | Oswin | 136—86 |
| 3,393,098 | 7/1968 | Hartner et al. | 136—86 |

ALLEN B. CURTIS, Primary Examiner

A. SKAPARS, Assistant Examiner

U.S. Cl. X.R.

55—158; 136—120